(12) United States Patent
Sano

(10) Patent No.: US 6,442,390 B1
(45) Date of Patent: Aug. 27, 2002

(54) CELL-SITE BROADCASTING METHOD USING TRAFFIC CHANNELS AND A CONTROL CHANNEL

(75) Inventor: Fumiharu Sano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/347,449

(22) Filed: Jul. 6, 1999

(30) Foreign Application Priority Data

Jul. 7, 1998 (JP) .......................................... 10-191173

(51) Int. Cl.[7] ................................................ H04Q 7/20
(52) U.S. Cl. ..................................................... 455/450
(58) Field of Search ................................. 455/450, 405, 455/434, 451, 452, 464, 509, 510, 511, 515, 517

(56) References Cited

U.S. PATENT DOCUMENTS

| | | | | |
|---|---|---|---|---|
| 5,659,879 A | * | 8/1997 | Dupuy ........................ | 455/15 |
| 5,778,318 A | * | 7/1998 | Talarmo et al. .............. | 455/452 |
| 5,806,003 A | * | 9/1998 | Jolma et al. ................. | 455/522 |
| 6,055,437 A | * | 4/2000 | Riley et al. .................. | 455/511 |
| 6,018,550 A | * | 8/2000 | Wiorek et al. ............... | 455/447 |
| 6,128,336 A | * | 10/2000 | Rossi ......................... | 375/222 |
| 6,133,854 A | * | 10/2000 | Yee et al. .................... | 340/907 |
| 6,134,314 A | * | 10/2000 | Dougherty et al. ......... | 370/207 |
| 6,157,839 A | * | 12/2000 | Cerwall et al. ............. | 455/450 |

FOREIGN PATENT DOCUMENTS

| | | |
|---|---|---|
| WO | 94/17643 | 8/1994 |
| WO | 95/12936 | 5/1995 |

\* cited by examiner

*Primary Examiner*—William Trost
*Assistant Examiner*—Congvan Tran
(74) *Attorney, Agent, or Firm*—Sughrue Mion, PLLC

(57) ABSTRACT

In a cell-site base station, a received broadcast message is stored in a memory and traffic channels and a control channel are monitored. If at least one traffic channel, a traffic channel is established and data is read from the memory and transmitted on the established channel to mobile stations. If a call request is placed on the established traffic channel during the broadcast transmission and if the control channel is available, the control channel is established instead of the traffic channel to continue the broadcast transmission. If at least one traffic channel becomes available, the control channel is replaced with a traffic channel to continue the broadcast transmission. For transmitting command messages from the base station to the mobile stations, a broadcast control channel is used.

16 Claims, 7 Drawing Sheets

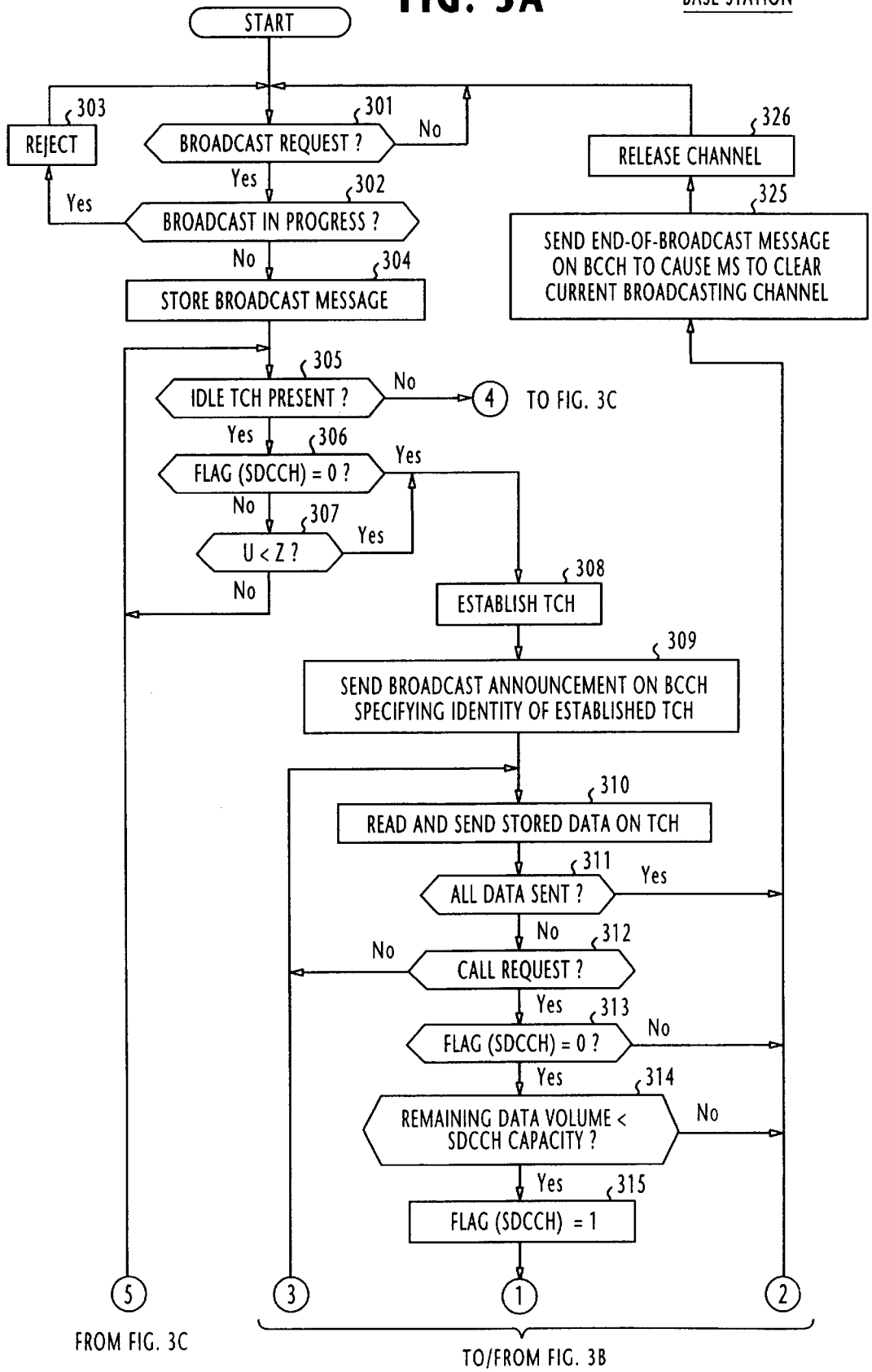
FIG. 3A — BASE STATION

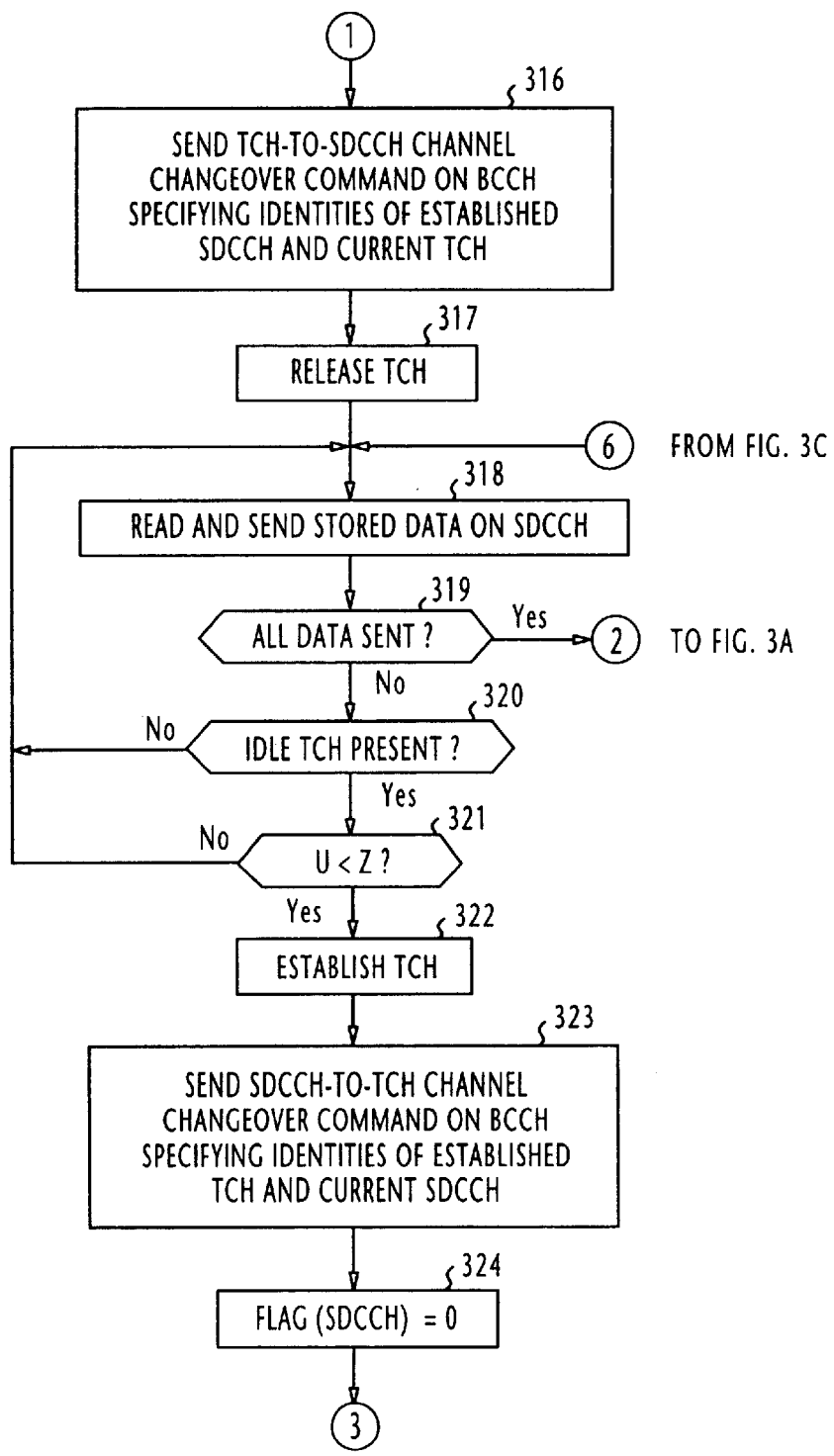

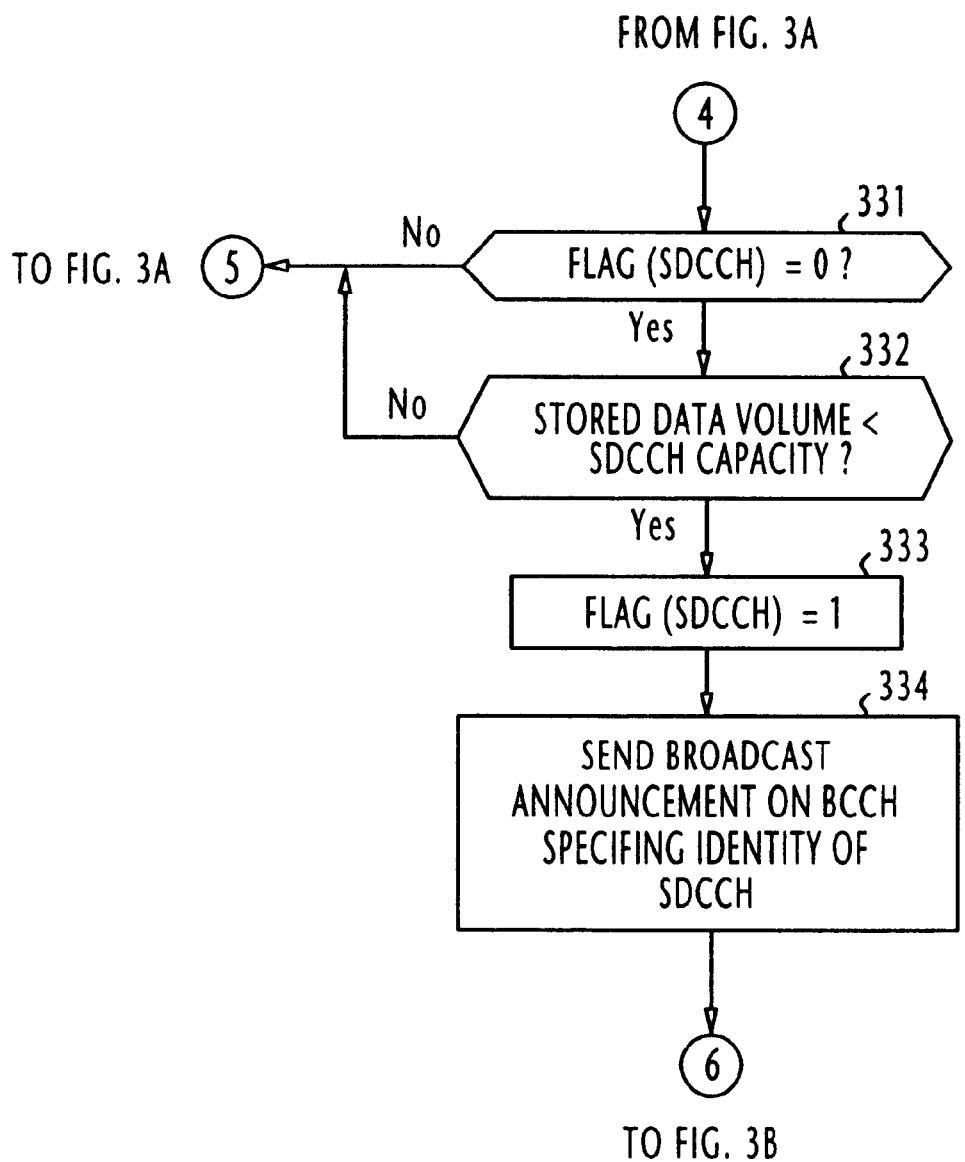

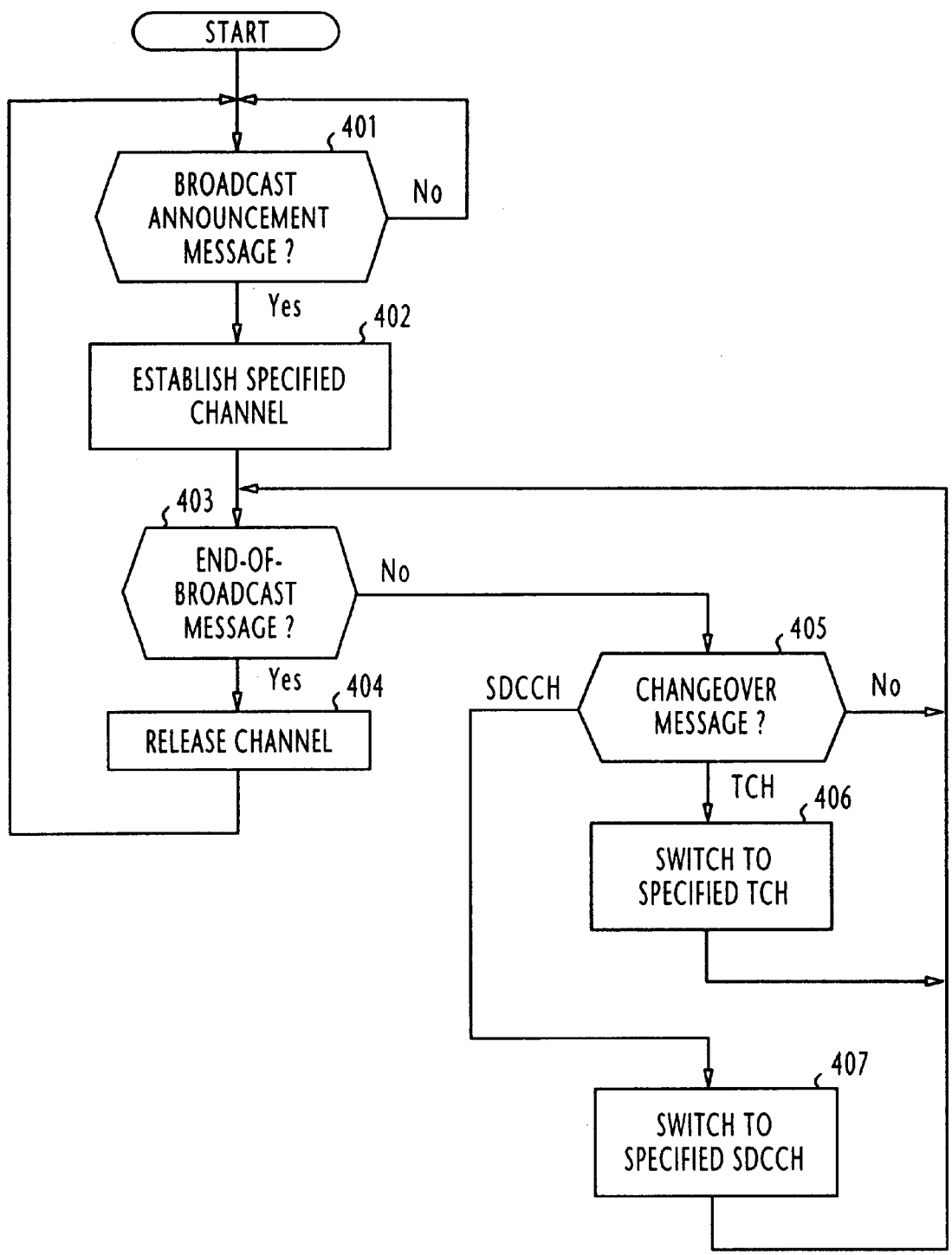

CELL-SITE BROADCASTING METHOD USING TRAFFIC CHANNELS AND A CONTROL CHANNEL

BACKGROUND OF THE INVENTION

1. Field of the Invention

The present invention relates generally to cellular mobile communication systems in which traffic channels are dynamically assigned to each call, and more specifically to a mobile communication system which efficiently enables transmission of a broadcast message.

2. Description of the Related Art

In prior art cellular mobile communication systems, a control channel is used to transmit a broadcast announcement message for announcing that a broadcast message is being transmitted and a channel indication for notifying the identity of the channel on which the broadcast message is transmitted. In one prior art system, if a call request is issued on a traffic channel that is being used for transmitting a broadcast message, priority is on the broadcast message and the call request is rejected. Another prior art system places priority on call requests. According to this system, if a call request is placed on a base station in the presence of a broadcast message transmitted on traffic channels, an interruption message and their channel identifiers are sent to mobile stations to interrupt the transmission of the broadcast message. For example, Japanese Laid-Open Patent Specification Hei-9-214422 discloses a system in which idle traffic channels are used to transmit a broadcast message. If a call request occurs when a broadcast message is being transmitted, the broadcast transmission is interrupted and information to that effect is communicated to mobile stations on a control channel. However, the prior art systems suffer from the following problems. The first prior art cannot accept new call requests if they occur during the presence of a broadcast message since assignment of traffic channels is not performed. In the second prior art system as disclosed in the above mentioned Japanese laid-open patent specification, the transmission of the interrupted broadcast message cannot be resumed until idle traffic channels are available. In addition, broadcast messages cannot be sent in so far as idle traffic channels are not available.

SUMMARY OF THE INVENTION

It is therefore an object of the present invention to enable base stations to assign traffic channels to a call request if it occurs in the presence of a broadcast message being transmitted to continue the transmission of the broadcast message.

Another object of the present invention is to enable transmission of a broadcast message if there is no idle traffic channel.

According to a first aspect of the present invention, there is provided a broadcasting method for a mobile communication system, wherein a broadcast control channel is used to transmit identity of a channel on which a broadcast message is transmitted from a base station to mobile stations. The method comprises establishing a traffic channel, in response to a broadcast request, when at least one traffic channel is available for transmitting the broadcast message from the base station to the mobile stations, and establishing a control channel for transmitting the broadcast message from the base station to the mobile stations when all traffic channels are not available and establishing the control channel instead of the established traffic channel if a call request is placed on the traffic channel when the transmission of the broadcast message is in progress. In a preferred embodiment, the method comprises determining usage ratio of the traffic channels of the base station, and establishing a traffic channel instead of the established control channel if the usage ratio becomes smaller than a predetermined value during the time the transmission of the broadcast message is in progress.

According to a second aspect the present invention provides a broadcasting method for a base station of a mobile communication system, the base station having a plurality of traffic channels and a control channel, comprising the steps of (a) storing a received broadcast message in a memory, (b) determining whether at least one traffic channel is available and determining whether the control channel is available if all of the traffic channels are not available, (c) establishing a channel depending on channel availability of the step (b), (d) reading data from the memory and transmitting the data on the established channel, (e) if the established channel is a traffic channel and a call request is placed on the traffic channel, establishing the control channel instead of the traffic channel and performing the step (d) on remaining data in the memory, and (f) if at least one traffic channel is made available while the step (d) is being performed, establishing the available traffic channel instead of the control channel and performing the step (d) on remaining data in the memory.

According to a third aspect, the present invention provides a base station of a mobile communication system, the base station having a plurality of traffic channels and a control channel. The base station comprises a memory, a broadcast receiver for receiving a broadcast message from a network, a control processor for storing the broadcast message in the memory, determining channel availability of at least one traffic channel and channel availability of the control channel if all of the traffic channels are not available, establishing a channel depending on the channel availability of the channels, reading data from the memory, and transmitting the data on the established channel. The control processor is arranged to establish the control channel instead of the traffic channel if a call request is placed on the traffic channel during the time reading of the data from the memory is in progress, and reestablish a traffic channel instead of the control channel if at least one traffic channel is made available during the time reading of the data is still in progress.

According to a fourth aspect, the present invention provides a mobile communication system comprising a base station for establishing a traffic channel if at least one traffic channel is available in response to a broadcast request from a network, establishing a control channel for transmitting a broadcast message to mobile stations when traffic channels are not available, and establishing the control channel instead of the traffic channel for transmitting the broadcast message when a call request is placed on the traffic channel during the time the transmission of the broadcast message is in progress, the base station being in constant communication with each of the mobile stations via a broadcast control channel to transmit a command message. Each of the mobile stations is in constant communication with the base station via the broadcast control channel to receive the command message for establishing a channel to the base station in accordance with the command message.

BRIEF DESCRIPTION OF THE DRAWINGS

The present invention will be described in further detail with reference to the accompanying drawings, in which:

FIGS. 3A, 3B and 3C are flowcharts of the operation of the control processor of the base station according to the present invention;

FIG. 4 is a flowchart of the operation of the control processor of each mobile station according to the present invention.

DETAILED DESCRIPTION

Figure 1:
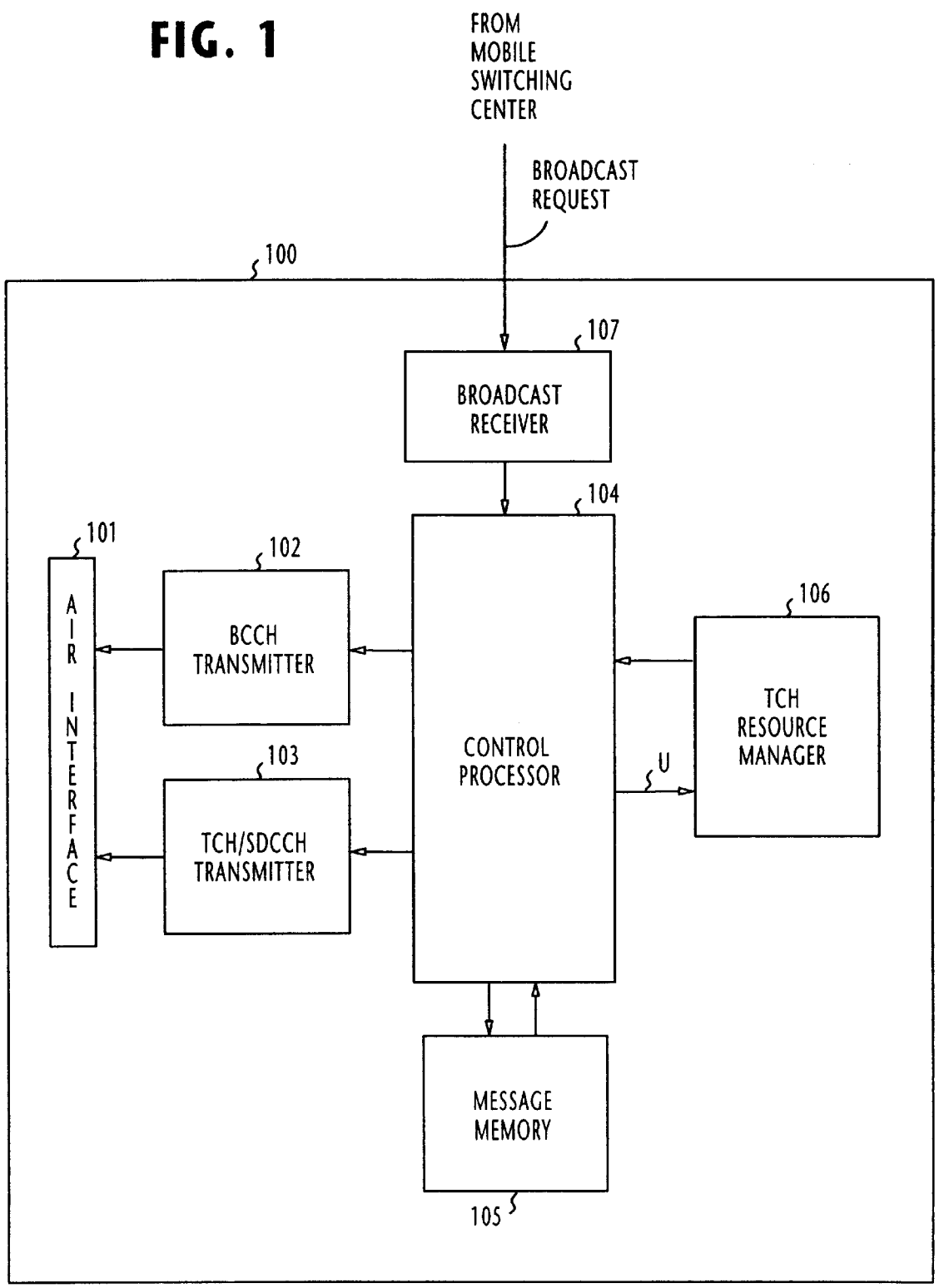
FIG. 1 is a block diagram of a base station of the present invention.
Figure 2:
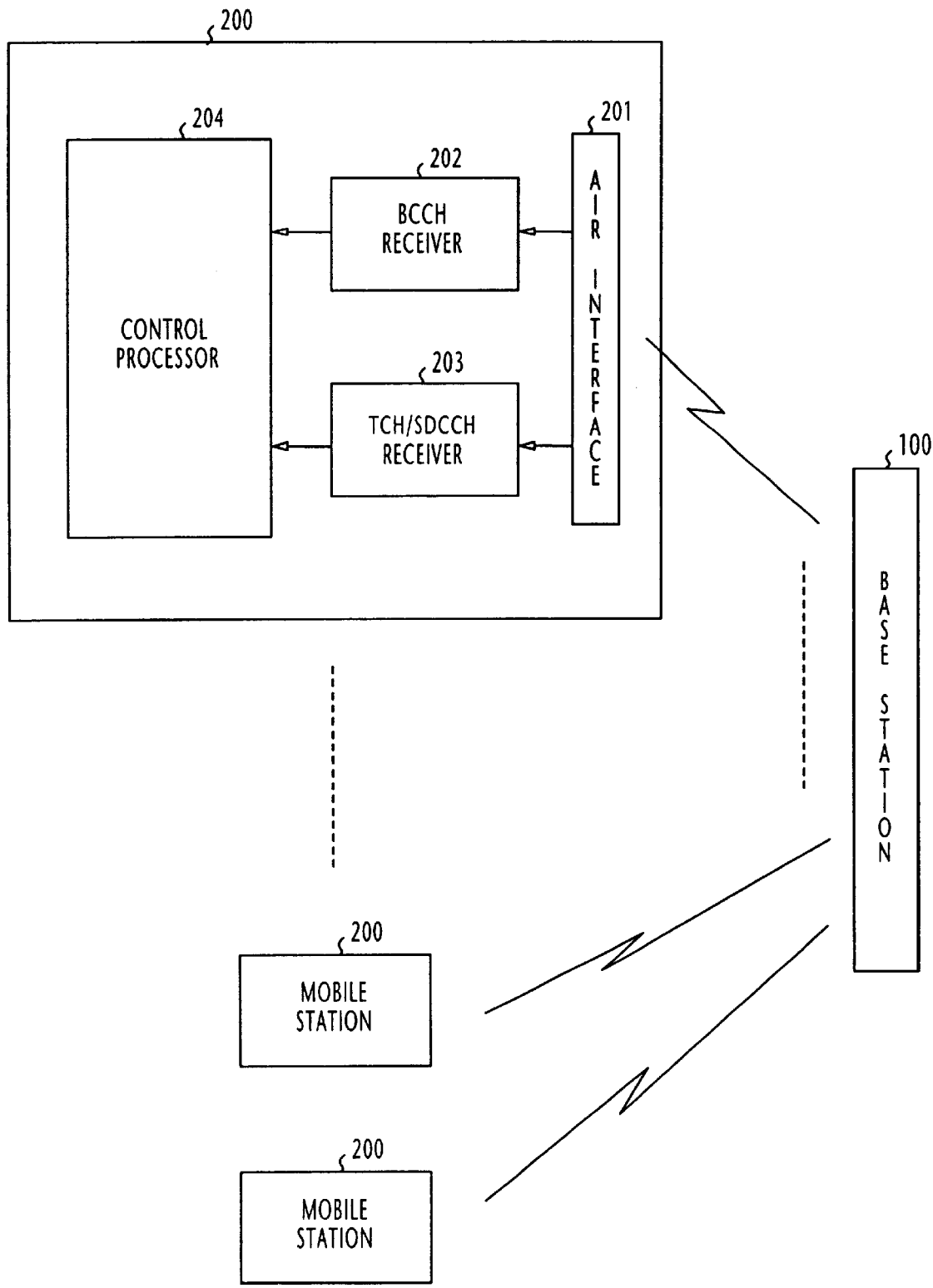
FIG. 2 is a block diagram of mobile stations of a cellular mobile communication system embodying the present invention.

Referring now to FIGS. 1 and 2, a CDMA (code division multiple access) cellular mobile communication system is shown in which the present invention is embodied. The system comprises a base station 100 for covering one of a plurality of cells and a plurality of mobile stations 200 located within the coverage area of the base station 100. For simplicity, only broadcasting circuitry is illustrated in both mobile and base stations. Spread spectrum signals are exchanged between the mobile stations and the base station via respective air interface units 101 and 201.

In FIG. 1, the base station includes a BCCH (broadcast control channel) transmitter 102 and a TCH/SDCCH (traffic channel/stand-alone dedicated control channel) transmitter 103 connected to the air interface unit 101. The BCCH transmitter receives command messages from a control processor 104 for transmission to the mobile stations via the air interface 101. These messages includes a broadcast announcement, a channel changeover command and an end-of-broadcast command. The TCH/SDCCH transmitter receives broadcast messages from the control processor 104 for transmission of spread spectrum broadcast signals to the mobile stations via the air interface 101 either on a traffic channel or the stand-alone dedicated control channel. The control processor 104 is associated with a message memory 105, a TCH resource manager 106 and a broadcast receiver 107. The broadcast receiver 107 is connected to the mobile switching center, not shown, via a land-line system to receive a broadcast request and an accompanying broadcast message. The received broadcast message is stored into the message memory via the control processor 104. The TCH resource manager monitors all traffic channels of the base station to determine their current usage ratio upon request from the control processor 104.

In FIG. 2, each mobile station includes a BCCH receiver 202 and a TCH/SDCCH receiver 203. The BCCH receiver is connected to the air interface 201 to receive spread spectrum command signals from the base station and supplies command messages to a control processor 204. The TCH/SDCCH receiver is also connected to the air interface 201 to receive spread spectrum broadcast signals. The control processor 204 is responsive to a broadcast command message from the BCCH receiver to control the TCH/SDCCH receiver to establish a channel to receive the broadcast message from the base station.

As will be described, this channel is established by using an idle channel resource which may be one of a plurality of the traffic channels of the base station or the stand-alone dedicated control channel of the base station.

According to the present invention, a traffic channel and the cell-site's stand-alone dedicated control channel are selectively employed for the transmission of broadcast messages.

The operation of the control processor of the base station proceeds as follows according to the flowcharts of FIGS. 3A, 3B and 3C when the base station receives a broadcast message from the mobile switching center.

In FIG. 3A, program execution of the cell-site control processor starts with step 301 to check to see if a broadcast message and its accompanying message are received from the broadcast receiver 207. If this is the case, the control processor advances to step 302 to check to see if a broadcast message is currently being transmitted. If so, flow proceeds from step 302 to step 303 to reject the broadcast request and returns to the starting point of the routine. If there is no broadcast currently in progress, control branches at step 302 to step 304 to store the received broadcast message into the message memory, and then proceeds to step 305 to check with the TCH resource manager to determine if there is at least one idle traffic channel (TCH).

If at least one idle traffic channel is present, control branches at step 305 to step 306 to check to see if the stand-alone dedicated control channel is currently in use by examining its flag. If this channel is in use, the flag is 1.

If the SDCCH flag is 0 at step 306, it is determined that there are at least two channels available for transmitting the broadcast message, and flow proceeds to step 308 to seize an idle traffic channel and establish it for downlink transmission.

If the SDCCH flag is 1 at step 306, it is determined that there are at least one channel available for transmitting the broadcast message, and flow proceeds to step 307 to determine if the channel usage ratio (U) of the cell-site's traffic channels is smaller than a preset value Z. If the decision at step 307 is affirmative, control proceeds to step 308. Otherwise, the control processor repeatedly executes steps 305 to 307 until the decision at step 306 or 307 becomes affirmative.

At step 309, the base station then sends a broadcast announcement message on the broadcast control channel (BCCH), specifying the identity of the seized traffic channel which the mobile stations will use to receive a broadcast message.

In the CDMA system of the present invention, the signal on each channel of a base station is spread with a channel-specific short PN (pseudonoise) code for channelization and further spread with a pair of cell-site specific long PN codes for in-phase and quadrature components, respectively. Therefore, for a given base station, each of the traffic channels and the stand-alone dedicated control channel can be identified by mobile stations in the coverage area of the base station with a signal specifying the identity of the channel-specific short PN code.

At step 310, the cell-site control processor reads data from the message memory and sends it over the established traffic channel. The control processor monitors the contents of the message memory to check to see if all broadcast message data stored in that memory are sent to mobile stations. If this is the case, the control processor proceeds to step 325 to send an end-of-broadcast message on the broadcast control channel in order that the mobile stations clear the currently established broadcasting channel. At step 326, the current channel is released at the base station and the flag of this channel is reset to 0 before the control processor returns to the starting point of the routine.

As long as the decision at step 311 is negative, control proceeds to step 312 to determine if a call request is placed on the current traffic channel. If not, flow returns from step 312 to step 310 to repeat the read-and-send process on the stored broadcast message.

If a call request is placed on the current traffic channel during this read-and-send process, flow proceeds from step 312 to step 313 to examine the SDCCH flag to see if this control channel is available. If the flag=0, the SD control channel is available and flow proceeds to step 314 to determine whether the volume of the broadcast message remaining in the message memory is smaller than the effective channel capacity of the cell-site's SD control channel. If the flag=1, it is determined that there is no available channels for transmitting the stored broadcast message and flow proceeds to step 325 to announce the interruption of broadcast and release the traffic channel (step 326).

If the remaining volume is not smaller than the effective channel capacity of the cell-site SDCCH, the decision at step 314 is negative and flow proceeds to step 325 to announce the interruption of broadcast.

If the remaining volume is smaller than the effective channel capacity of the cell-site SD control channel, it is determined, at step 314, that the remaining broadcast message can be transmitted on this dedicated control channel. The cell-site control processor proceeds from step 314 to step 315 to set the flag of the SDCCH equal to 1 and establish this control channel through the TCH/SDCCH transmitter.

In FIG. 3B, the control processor sends a channel changeover (from TCH to SDCCH) command message on the BCCH through the BCCH transmitter, specifying the identities of the cell-site's SDCCH and the current TCH in order that the mobile stations switch from the current traffic channel to the SDCCH (step 316). Immediately following this changeover command message, the control processor releases the traffic channel for the call request (step 317).

Using the SDCCH, the control processor continues sending the remaining broadcast message data (step 316). If the remaining broadcast data are all transmitted, the decision at step 319 is affirmative and flow proceeds to step 325. Otherwise, the control processor proceeds to step 320 to check to see if there is an idle traffic channel. If the decision at step 320 is negative, flow returns to step 318 to continue the read-and-send process on the remaining broadcast message.

If an idle traffic channel is detected (step 320) during the time the broadcast message is being transmitted on the standalone dedicated control channel, the cell-site control processor proceeds to decision step 321 to determine whether the channel usage ratio (U) of the cell-site's traffic channels is smaller than the preset value Z. If this usage ratio is not smaller than the preset value, the control processor returns from step 321 to step 318 to continue the read-and-send process.

If the usage ratio U of the traffic channels is smaller than the preset value Z, flow proceeds from step 321 to step 322 to seize an idle traffic channel and establish this channel through the TCH/SDCCH transmitter as a replacement for the currently used stand-alone dedicated control channel.

At step 323, the cell-site control processor sends a channel changeover (from SDCCH to TCH) command message on the broadcast control channel specifying the identity of the established traffic channel and the identity of the currently used SDCCH to cause the mobile stations to switch from the SDCCH to the established traffic channel.

At step 324, the SD control channel is released and its flag is reset to 0. Flow returns to step 310 (FIG. 3A) to continue the broadcasting of the remaining data in the message memory.

It is seen that if at least one idle traffic channel is initially available at step 305, steps 308 and 309 are executed to send a broadcast announcement message and then steps 310 through 324 will be repeatedly executed to use either traffic channel or stand-alone dedicated control channel to perform broadcasting until all broadcast data are transmitted.

If no idle traffic channel is initially available, the control processor proceeds from step 305 to step 331 (FIG. 3C) to check to see if the SD control channel is available by examining its flag. If the SD control channel is not available, flow returns from step 331 to step 305 (FIG. 3A). Otherwise, flow proceeds to step 332 to determine whether the volume of the stored broadcast message is smaller than the effective channel capacity of the SD control channel. If not, flow returns to step 305. If the decision at step 332 is affirmative, flow proceeds to step 333 to establish the SD control channel and set its flag to 1. A broadcast announcement message is sent on the broadcast control channel by specifying the identity of the established SD control channel (step 334). Flow returns to step 318 (FIG. 3B) to read and send the stored broadcast message on the established SD control channel.

In response to the control signals transmitted on the broadcast control channel from the base station 100, each mobile station within the coverage area of this base station proceeds according to the flowchart of FIG. 4.

Each mobile station is constantly monitoring the broadcast control channel using the BCCH receiver 202 to detect when a broadcast announcement message is received (step 401). In response to this message, the mobile's control processor proceeds to step 402 to establish a channel specified by the identity contained in the received announcement message. Decision step 403 is subsequently performed to detect when an end-of-broadcast message is received from the base station. If so, the control processor proceeds to step 404 to release the established channel and returns to the starting point of the routine. Otherwise, it proceeds to decision step 405 to check to see if a channel changeover message is received. If not, flow returns co step 403 to repeat the process.

If a TCH to SDCCH changeover message is received, the current channel is a traffic channel and flow proceeds from step 405 to step 407 to switch from the current traffic channel to the SD control channel, and returns to step 403. If an SDCCH to TCH changeover message is received, the current channel is the SD control channel and flow proceeds to step 406 to switch to a traffic channel specified by this changeover message, and returns to step 403.

Figure 5B:
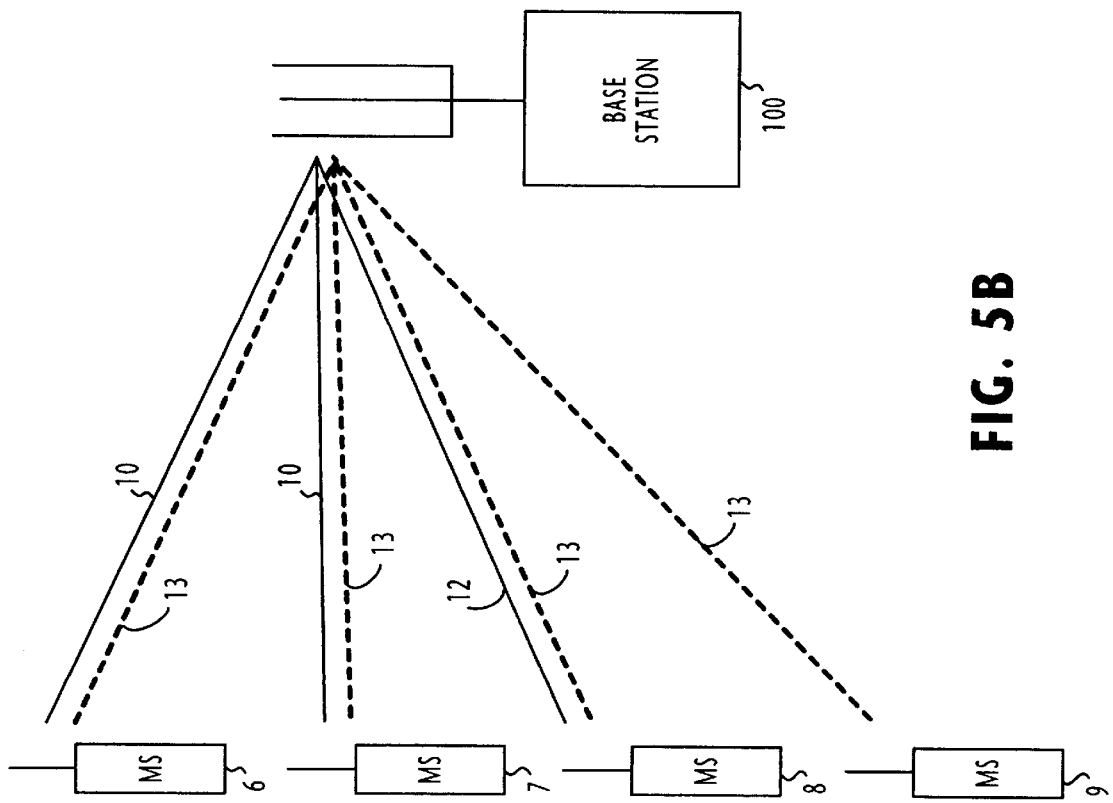
FIGS. 5A and 5B are schematic diagrams for describing the present invention.

For a full understanding of the present invention, two example cases are explained with reference to FIGS. 5A and 5B by assuming that mobile stations 6, 7, 8 and 9 are within the coverage area of the base station 100 and that three traffic channels are assigned to this base station.

Figure 5A:
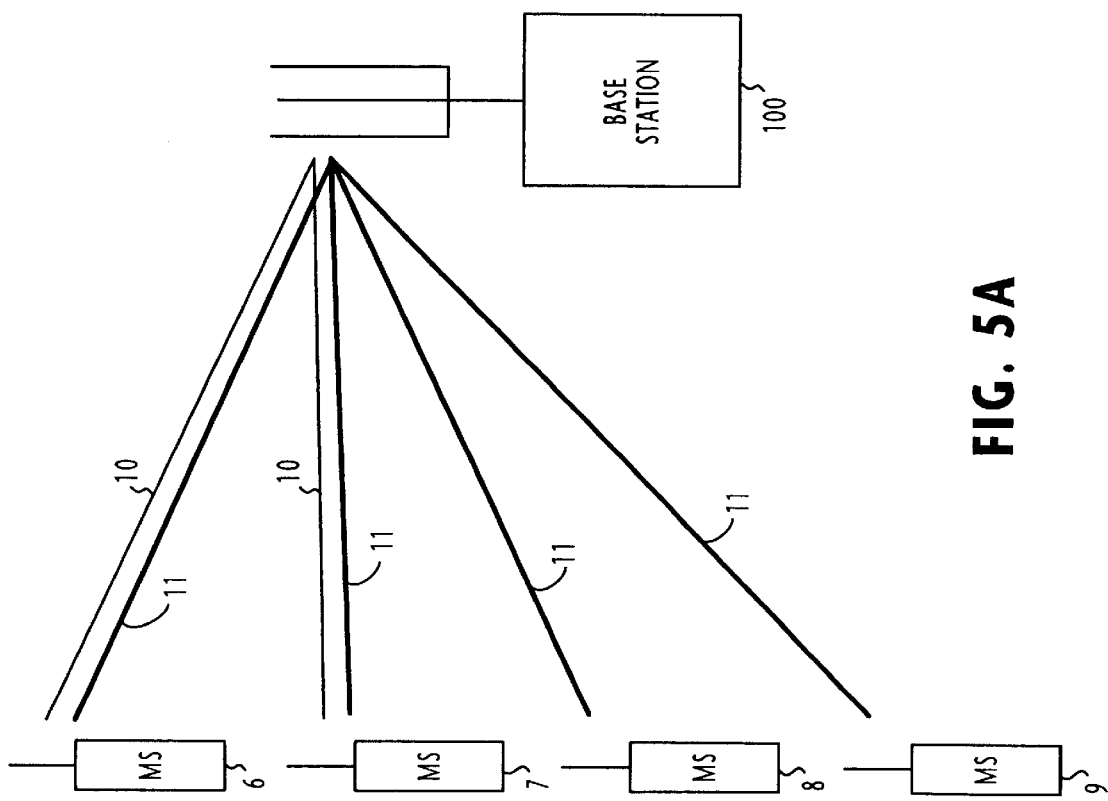

Assume that two traffic channels are in use by mobile stations 6 and 7 for individual calls when the base station receives a broadcast request and an accompanying broadcast message from the mobile switching center, as indicated by lines 10 in FIG. 5A. Since one traffic channel is available, this traffic channel is used for transmitting the broadcast message. All mobile stations establish this traffic channel to receive the broadcast message. The transmitted broadcast message propagates over different paths as indicated by thick lines 11 in FIG. 5A and is received by all mobile stations. During the transmission of the broadcast message, if the mobile station 8 places a call request and if the SD control channel is available, this control channel is used as a broadcast channel and the current traffic channel is released for the call request to establish a connection 12. The broadcast message is then transmitted on this control channel over paths as indicated by thick dotted lines 13 in FIG. 5B.

What is claimed is:

1. A broadcasting method for a mobile communication system, wherein a broadcast control channel is used to transmit identity of a channel on which a broadcast message is transmitted from a base station to mobile stations, the method comprising:

establishing, in response to a broadcast request, a traffic channel when at least one traffic channel is available for transmitting the broadcast message from the base station to the mobile stations;

establishing a control channel for transmitting the broadcast message from the base station to the mobile stations when all traffic channels are not available and establishing the control channel instead of the established traffic channel if a call request is placed on the traffic channel when the transmission of said broadcast message is in progress;

determining usage ratio of the traffic channels of the base station; and establishing a traffic channel instead of the established control channel if the usage ratio becomes smaller than a predetermined value during the time the transmission of the broadcast message is in progress.

2. A broadcasting method for a base station of a mobile communication system, said base station having a plurality of traffic channels and a control channel, comprising the steps of:

a) storing a received broadcast message in a memory;

b) determining whether at least one traffic channel is available and determining whether said control channel is available if all of said traffic channels are not available;

c) establishing a channel depending on channel availability of the step (b);

d) reading data from said memory and transmitting the data on the established channel;

e) if the established channel is a traffic channel and a call request is placed on the traffic channel, establishing said control channel instead of the traffic channel and performing the step (d) on remaining data in said memory; and f) if at least one traffic channel is made available while the step (d) is being performed, establishing the available traffic channel instead of the control channel and performing the step (d) on remaining data in said memory.

3. The method of claim 2, wherein the step (c) comprises the step of transmitting identity of the established channel on a broadcast control channel from the base station to mobile stations.

4. The method of claim 2, wherein the step (e) comprises the step of suspending the transmission of said broadcast message when said call request is placed on the traffic channel if said remaining data is greater in volume than channel capacity of said control channel.

5. The method of claim 2, wherein the step (b) comprises the steps of:

determining usage ratio of said traffic channels if said control channel is not available; and comparing the usage ratio with a predetermined value, and wherein the step (c) comprises the step of establishing a traffic channel if the usage ratio is smaller than the predetermined value and performing the step (b) if the usage ratio is greater than the predetermined value.

6. The method of claim 2, wherein the step (f) comprises the steps of:

determining usage ratio of said traffic channels;

comparing the usage ratio with a predetermined value; and establishing said available traffic channel if the usage ratio is smaller than the predetermined value and performing the step (d) if the usage ratio is greater than the predetermined value.

7. The method of claim 2, wherein said mobile communication system is a code division multiple access system.

8. The method of claim 2, wherein said control channel is a stand-alone dedicated control channel.

9. A base station of a mobile communication system, wherein a broadcast control channel is used to transmit identity of a channel on which a broadcast message is transmitted from a base station, wherein the base station is arranged to:

establish a traffic channel if at least one traffic channel is available, establish a control channel for transmitting the broadcast message to mobile stations when traffic channels are not available, establish said control channel instead of the traffic channel for transmitting the broadcast message when a call request is placed on the traffic channel when the transmission of the broadcast message is in progress, determine usage ratio of the traffic channels of the base station, and establish a traffic channel instead of the established control channel when the transmission of the broadcast message is in progress if the usage ratio is smaller than a predetermined value.

10. A base station of a mobile communication system, said base station having a plurality of traffic channels and a control channel, comprising:

a memory;

a broadcast receiver for receiving a broadcast message from a network;

a control processor for storing the broadcast message in said memory, determining channel availability of at least one traffic channel and channel availability of said control channel if all of said traffic channels are not available, establishing a channel depending on the channel availability of said channels, reading data from said memory, and transmitting the data on the established channel, said control processor establishing said control channel instead of the traffic channel if a call request is placed on the traffic channel during the time reading of said data from said memory is in progress, and reestablishing a traffic channel instead of the control channel if at least one traffic channel is made available during the time reading of said data is still in progress.

11. The base station of claim 10, wherein the control processor is arranged to transmit identity of the established channel on a broadcast control channel to mobile stations.

12. The base station of claim 10, wherein the control processor is arranged to suspend the transmission of said broadcast message when said call request is placed on the traffic channel if data remaining in said memory is greater in volume than channel capacity of said control channel.

13. The base station of claim 11, wherein the control processor is arranged to:

determine usage ratio of said traffic channels;

compare the usage ratio with a predetermined value; and establish a traffic channel if the usage ratio is smaller than the predetermined value and read data from said memory for transmission on the established traffic channel if the usage ratio is greater than the predetermined value.

14. The base station of claim 11, wherein said mobile communication system is a code division multiple access system.

15. The base station of claim 11, wherein said control channel is a stand-alone dedicated control channel.

16. A mobile communication system comprising:

at least one base station operative to establish a plurality of traffic channels and a dedicated control channel; and a plurality of mobile stations;

said at least one base station being operative to transmit control information to corresponding mobile stations on said dedicated control channel, and said at least one base station being operative to transmit a broadcast message to said corresponding mobile stations on said dedicated control channel instead of on a traffic channel, in response to a broadcast request from said network, when an allocation is available for broadcasting said broadcast message in addition to said control information on said control channel such that traffic information is reduced by a corresponding amount on at least one of said traffic channels, said at least one base station being in constant communication with each of said corresponding mobile stations via a broadcast control channel and being operative to transmit a command message on said broadcast control channel, each of said corresponding mobile stations being in constant communication with said at least one base station via said broadcast control channel and being operative to receive said command message for establishing a channel to the base station in accordance with the command message.

* * * * *